(12) United States Patent  
Yan et al.

(10) Patent No.: US 10,190,909 B2  
(45) Date of Patent: Jan. 29, 2019

(54) PATH DETECTION SYSTEM BASED ON SOLAR BLIND ULTRAVIOLET LIGHT SIGNALS

(71) Applicant: NANJING UNIVERSITY 5D TECHNOLOGY CO., LTD., Nanjing (CN)

(72) Inventors: Feng Yan, Nanjing (CN); Jun Wang, Nanjing (CN); Xiang Li, Nanjing (CN); Xun Cao, Nanjing (CN); Xi Zhu, Nanjing (CN); Wei Li, Nanjing (CN); Weisong Pan, Nanjing (CN)

(73) Assignee: NANJING UNIVERSITY 5D TECHNOLOGY CO., LTD. (CN)

( * ) Notice: Subject to any disclaimer, the term of this patent is extended or adjusted under 35 U.S.C. 154(b) by 131 days.

(21) Appl. No.: 15/510,705

(22) PCT Filed: Apr. 17, 2015

(86) PCT No.: PCT/CN2015/076860  
§ 371 (c)(1),  
(2) Date: Mar. 13, 2017

(87) PCT Pub. No.: WO2016/037485  
PCT Pub. Date: Mar. 17, 2016

(65) Prior Publication Data  
US 2017/0261369 A1 Sep. 14, 2017

(30) Foreign Application Priority Data  
Sep. 12, 2014 (CN) .......................... 2014 1 0465331

(51) Int. Cl.  
*G01J 1/42* (2006.01)  
*E01F 11/00* (2006.01)  
(Continued)

(52) U.S. Cl.  
CPC ............... *G01J 1/429* (2013.01); *E01F 11/00* (2013.01); *G05D 1/0242* (2013.01); *G01C 21/265* (2013.01); *G05D 2201/0213* (2013.01)

(58) Field of Classification Search  
CPC ........ G01J 1/429; E01F 11/00; G05D 1/0242; G05D 2201/0213; G01C 21/265  
See application file for complete search history.

(56) References Cited

U.S. PATENT DOCUMENTS

| 4,307,791 A | 12/1981 | De Bruine |
| 2004/0223056 A1* | 11/2004 | Norris, Jr. ............ G08B 13/183 348/152 |

(Continued)

FOREIGN PATENT DOCUMENTS

| CN | 101363918 A | 2/2009 |
| CN | 101363918 B * | 1/2011 |

(Continued)

OTHER PUBLICATIONS

International Search Report; PCT/CN2015/076860; International Filing Date: Apr. 17, 2015; 3 pgs.

*Primary Examiner* — Marcus Taningco  
(74) *Attorney, Agent, or Firm* — Schmeiser, Olsen & Watts, LLP

(57) ABSTRACT

A path detection system based on SBUV light signals is provided, including a SBUV light signal emitter, a SBUV detectors and a signal processing module, wherein the SBUV light signal emitter is arranged on a road to serve as a path mark line; the SBUV detector is configured to detect the path mark line and transmit the detected signals from the SBUV light signal emitter to the signal processing module; and the signal processing module acquires a traveling path in real time by using a path line extraction algorithm, and eventually outputs path information.

9 Claims, 3 Drawing Sheets

(51) Int. Cl.
*G05D 1/02* (2006.01)
*G01C 21/26* (2006.01)

(56) References Cited

U.S. PATENT DOCUMENTS

| | | | |
|---|---|---|---|
| 2007/0253713 A1 | 11/2007 | Reilly et al. | |
| 2011/0309331 A1* | 12/2011 | Yu | H01L 27/1443 257/21 |
| 2011/0320112 A1 | 12/2011 | Anderson | |

FOREIGN PATENT DOCUMENTS

| | | |
|---|---|---|
| CN | 102903258 A | 1/2013 |
| CN | 202703312 U | 1/2013 |
| JP | 2012098813 A | 5/2012 |

\* cited by examiner

PATH DETECTION SYSTEM BASED ON SOLAR BLIND ULTRAVIOLET LIGHT SIGNALS

CROSS-REFERENCE TO RELATED APPLICATIONS

This application claims priority to PCT Application No. PCT/CN2015/076860, having a filing date of Apr. 17, 2015, based on CN 2014 1046 5331.2, having a filing date of Sep. 12, 2014, the entire contents both of which are hereby incorporated by reference.

FIELD OF TECHNOLOGY

The following relates to the technology of path detection during the automatic driving, and in particular to a system capable of detecting road information already marked by solar ultraviolet light signals by using a solar blind ultraviolet (SBUV) detector and processing the detected signals to obtain detailed parameters of a road path.

BACKGROUND

With the continuous development of science and technology, the automatic driving of airplanes and trains has already been realized. However, for automobiles, the progress of automatic driving is far behind the airplanes and trains since the driving environment is relatively complicated. At present, the automatic driving technology for automobiles has become a technology on which various automobile developers has required more attention to develop. Even Google Inc., as a large Internet company, has been researching automatic driving technology for automobiles, and has developed prototype vehicles so far.

The basis for realizing the automatic driving of an automobile is to be able to sense the surrounding driving environment and acquire accurate path information. There are various environment sensing methods in the existing unmanned driving technology, for example, magnetic signal sensing, visual sensing, laser sensing, microwave sensing, communication sensing and the like. However, mainstream path extraction methods include: road navigation by using magnetic signals, visual navigation by using a visible light camera, and environmental restoration by using a laser radar.

A test vehicle with an automatic driving function had been developed in 1995 in Japan, and its method for sensing path information is to embed a magnet wire in the center of a road, provide a magnetic field detection sensor on an automobile, and acquire a travelling path by detecting the magnetic wire. In 2014, the Volvo Corporation announced that it was developing a magnetic navigation system to instruct the unmanned driving. Magnets distributed at fixed intervals were paved on a road, a magnetic sensor was provided on an automobile, and path information was detected by detecting signals from the road magnet arrays in real time, so as to correct the course. Although the path detection based on magnetic signals has the advantage of low degree of interference from the surrounding, path information cannot be extracted since the signal noise is very high when the magnetic sensor detects magnetic signals beyond a certain distance. Meanwhile, during the multilane path detection, the mutual interference of magnetic signals will result in unclear path information. When road navigation is performed by using magnetic signals, the path detection distance is limited, and the detected road environment is limited.

Path detection by visual navigation by using a visible light camera is to acquire two-dimensional or three-dimensional image information of the surroundings of a vehicle by using a camera, and sense the driving environment by an image analysis and recognition technology. In practical applications, the path detection based on this method has complicated background information, requires a complicated image processing algorithm, and is difficult to acquire correct path information by image processing means at night, under severe weather (windy and dusty, heavy fog and rainy) and in a complex illumination environment. For example, first, when a path facing a light source is extracted, the image acquired by the visible light camera may be over-saturated due to the complex illumination, and in this case, it is impossible to acquire the path by image processing. Second, when driving at night, the path obtained by the visible light camera is dark, and the field of view is very limited even if lamps of the automobile or lamps of the camera are used for illumination. Third, in a case of complicated path conditions, there are many roads in the images shot by the visible light camera, and roadside trees are also included in the images, and accordingly, it requires many complicated algorithms and takes a very long period of time to obtain possibly correct results. Thus, the path detection by using the visible light camera does not necessarily obtain correct path results although it requires a series of complicated image processing. When the path information is acquired in this way, both the timeliness and the reliability are low.

The path detection by using laser sensing is to acquire two-dimensional or three-dimensional distance information of the surroundings of a vehicle by using a laser radar, and sense the driving environment by a distance analysis and recognition technology. By using a high-performance laser radar, a 3D topographic map within a certain range can be drawn timely and accurately, and then uploaded to an on-board computer center. In this way, pedestrians, vehicles and barriers to be encountered may be detected. This method is to perform distance measurement and environment reconstruction by emitting laser beams and using the returned information. However, this method, when used in an open environment, is unable to estimate the result of environment reconstruction and thus unable to acquire a correct path. The path detection by using a laser radar has a limited application environment and a high price, and is inconvenient for on-board integration.

In addition to the navigation modes used alone, in order to increase the reliability of path extraction, unmanned vehicles usually employ a combination of different sensing ways for the purpose of judgment. Taking an unmanned vehicle produced by Google as an example, visual sensing, laser sensing and communication sensing are integrated together. Before automatic driving, it is required to record the course of driving an unmanned vehicle by a person in an intended path, and then store it in a remote server. During driving by following the path, on one hand, existing images are processed by visual sensing to analyze the existing path information; meanwhile, by comparing the current image information with the image information stored in the server, it is helpful to judge the real condition of this path. On the other hand, road barriers and background information are judged by a three-dimensional laser scanner. Thus, the unmanned driving system is complicated, time-consuming in processing, and low in operability.

For the path extraction based on the integration of multiple sensors, the sensing system is too complicated, difficult to integrate, high in cost and poor in practicability. Unfortunately, even if the data from multiple sensors is combined, in a case of a complicated weather condition, the unmanned vehicle produced by Google still has problems in terms of path extraction. Liz Gannes, a reporter from Recode and after experiencing the unmanned vehicle produced by Google, said "the sensors for the unmanned vehicle produced by Google have problems in a rainy environment; if it is snowy, more serious problems will arise; and in a heavy fog environment, it is best to drive manually".

In the field of automatic driving of automobiles, undoubtedly, the acquisition of correct path information during the whole automatic driving process is crucially important. If the path detection is wrong, the diving direction of the automobile will be deviated, and immeasurable losses will be caused. The path detection methods by using magnetic signals, visible light information, laser sensing and the like all have some deficiencies in the technical field of automatic driving. Accordingly, it is very important to provide a simple and reliable path detection method.

The visible light camera is affected in the complex illumination, because the reflected sunlight, scattered sunlight or the like in the path line is shot and the real path information is thus masked. Meanwhile, in the visible light image processing, it is required to remove useless background information and the like from the image, because the shot path line will mislead the result of the path due to the interference from the background information. Since the signal-to-noise ratio increases sharply when the magnetic signals are transmitted beyond a certain distance, and the signal-to-noise ratio is susceptible to interference from an external magnet field and artificial contaminants (e.g., magnets, ores and the like), the path extraction based on magnetic signals has a small amount of acquired path information and is limited in a complicated environment. Thus, the automatic driving field needs a road extraction method which has a high anti-interference performance, a capability of working well under all weather conditions, a large amount of information expressed by the path, a high real-time performance, and an accurate result.

SBUV light signals are light signals in a wave band from 190 nm to 285 nm. The photons irradiated by the sun are isolated by the ozone layer. If the SBUV signals are detected on the earth, they are definitely generated artificially. By using SBUV light signals as markers of a path, the environmental interference is eliminated, and a very high capability of resisting against environmental interference is realized, according to the characteristics of SBUV band. A SBUV [U1] detector detects light signals only within this wave band, so that it can acquire signals even at night and in a severe weather condition regardless of environmental interferences from different places and different background information. Therefore, the SBUV detector has the advantage of path extraction under any weather condition. A SBUV light signal emitter has a long transmission distance. A milliwatt-level SBUV signal may transmit over 1 km to 3 km. If SBUV detectors have different field of views (FOV), we can get more information about the detected path. In the signal processing procedure, it is only required to process the arranged SBUV light signals, the path detection algorithm is simpler, faster, and the result of path extraction is more accurate without background interference.

SUMMARY

An aspect relates to a path detection system based on SBUV emitters and detectors. The SBUV path detection will not consider the interference from the complex illumination, weather and the like, and exclude the complicated foreground and background. Thus, the workload of a signal processing module is reduced, and the accurate path information may be acquired in real time by using a path extraction method with less time consumption.

The following employs the following technical solutions.

A path detection system based on SBUV light signals is provided, including a SBUV light signal emitter, a SBUV detector and a signal processing module, wherein the SBUV light signal emitter is arranged on a road to serve as a path mark line; the SBUV detector is configured to detect the path mark line and transmit the detected signals from the SBUV light signal emitter to the signal processing module; and the signal processing module acquires a travelling path in real time by using a path line extraction algorithm, and eventually outputs path information.

The SBUV light signal emitter may irradiate SBUV light signals for marking a path, and SBUV light signals emitters [U2] have a same intensity or different intensities.

Further, the SBUV light signal emitter includes a power supply, SBUV light sources and a signal intensity control circuit; and, when in use, the intensities of all the SBUV light emitters [U3] are kept consistent. The signal intensity control circuit may include, but is not limited to, a constant-current source a modulation circuit.

The SBUV light signal emitter as a path mark line may mark a road center line, a road edge line, or a line partition line for a plurality of lanes; and, the SBUV light signal emitter is mounted by paving them on a road surface or a road rock or erecting them to a certain height by using a support or a suspension device, or may be directly combined with a road lamp.

The SBUV detector is a SBUV imager, a SBUV one-pixel-detector array or a combination of the both, wherein the SBUV one-pixel-detector array consists of a plurality of SBUV one-pixel detectors which are arranged periodically.

The signal processing module includes a core processor, and the core processor is directly connected to an output of the SBUV detector and directly outputs a result of processing.

Further, the signal processing module further includes a signal collection circuit and a signal output circuit; an input of the signal collection circuit is connected to the output of the SBUV detector, and an output of the signal collection circuit is connected to the core processor; and an output of the core processor is connected to an input of the signal output circuit.

The path line extraction algorithm is to map coordinates of SBUV light information detected by the SBUV detector into coordinates in a real space, and then mathematically calculate information about a path marked by a SBUV image, so as to acquire detailed parameters of the path.

Further, the path line extraction algorithm is specifically as follows: (1) establishing a virtual coordinate system (i.e., an autonomously established coordinate system used for positioning the position of a SBUV beacon in the detected solar ultraviolet image or array) in the SBUV light information detected by the SBUV detector, and obtaining a conversion relationship between the virtual coordinate system and a real space coordinate system (used for positioning the real position of the SBUV beacon placed in the displayed road) by calibration; (2) classifying the detected SBUV light spots, and obtaining a mathematical expression of a path line in the virtual coordinate system by curve fitting; and, (3) discussing the monotonicity, concavity and curvature of a path line equation, calculating the turning direction, gradient, turning radius and other parameters of the path line at different intervals in the virtual coordinate system, and eventually obtaining path parameters of the real path line according to the conversion relationship between the two coordinate systems.

The SBUV detector in embodiments of the present invention has the capability of converting the detected SBUV light signals into electrical signals. There may be one, two or more detectors, and the SBUV detectors may detect SBUV light signals for marking the path within a certain range in different mounting ways. The SBUV detector outputs analog signals or digital signals, wherein the analog signals may be current signals, voltage signals, analog video signals and the like, and the digital signals may be SBUV intensity values, digital image information and the like.

The signal collection circuit in the technical solutions has the capability of converting the analog signals output from the SBUV detector into digital signals, and may also directly access and then preprocess the digital signals of the SBUV detector. The core processor may be a single-chip microcomputer, an ARM, a DSP, an SOC, an FPGA, a PC or other processing units, and the operation signal output circuit capable of performing a path detection algorithm may output the detected path information in the form of analog signals or digital signals.

The following has the hereinafter beneficial effects: the device and method for acquiring road information are simple and reliable, and the result of detection is accurate and reliable. With the use of the particularity of the SBUV light wave band, the influences from the complex illumination and road background information are avoided, so that this path detection system has a very high anti-interference capability. The SBUV light wave band is not susceptible to severe weather and climate, and the path detection system may operate under all weather conditions. Moreover, during the path extraction, only the SBUV light information is to be processed, so that accurate road information may be acquired within a very short period of time. Accordingly, the path detection system has good timeliness. The system may be widely applied in robot navigation, automatic driving of an automobile and other fields.

BRIEF DESCRIPTION

Some of the embodiments will be described in detail, with reference to the following figures, wherein like designations denote like members, wherein.

DETAILED DESCRIPTION

As described in the background art, the existing path detection methods have some deficiencies. In view of this, in terms of path detection, a method for overcoming the influence from the complicated environment and providing for accurate path detection is needed.

For this purpose, embodiments of the present invention will be further described below with reference to the accompanying drawings by embodiments. The following embodiments are merely illustrative, and embodiments of the present invention is not limited to the solutions in the embodiments. Additionally, all technical solutions obtained by simple transformation by those skilled in the art within the scope of the prior art shall fall into the protection scope of embodiments of the present invention.

Embodiment 1

Figure 1:
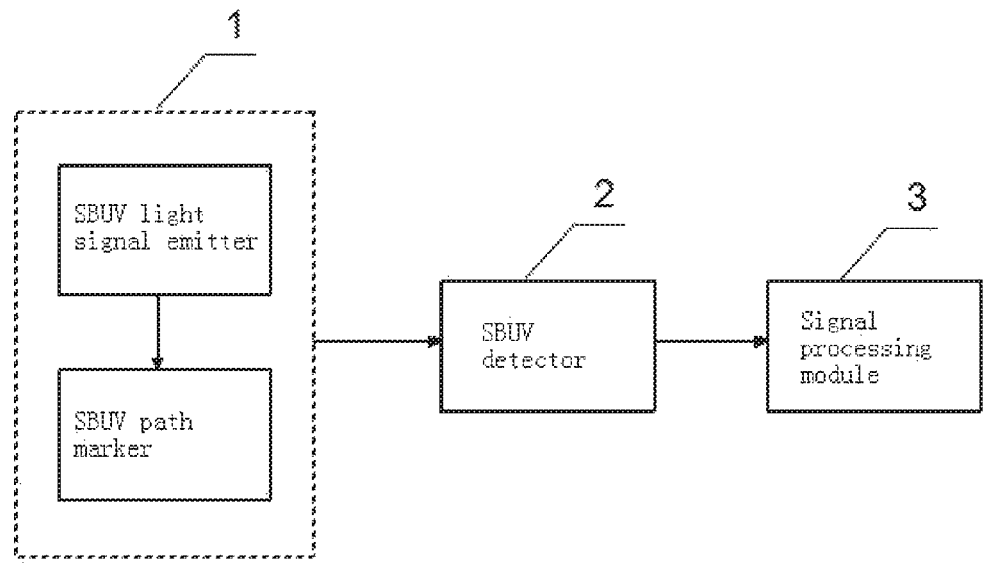
FIG. 1 is a block diagram of a path detection system based on SBUV light signals according to embodiments of the present invention.

FIG. 1 is a block diagram of a path detection system based on SBUV light signals. The path detection system mainly makes use of the particularity of the SBUV light wave band, uses a SBUV light signal emitter as a marker 1 of a path, then detects path information by a SBUV detector 2, and transmits the detected SBUV light signals to a signal processing module 3. By operating a path extraction algorithm in the signal processing module 3, the offset direction of the path, change in the offset amount, and the path curvature may be obtained. Wherein, the SBUV light signal emitter may irradiate SBUV light signals at different intensities. A plurality of signal emitters marks the path by a predetermined method and in a predetermined mounting way. The SBUV detector 2 is configured to detect a path line already marked by the SBUV light signal emitter. The signal processing module 3 may access to and process SBUV light signals in the form of analog or digital signals, and may calculate and output a result of path detection.

Figure 2:
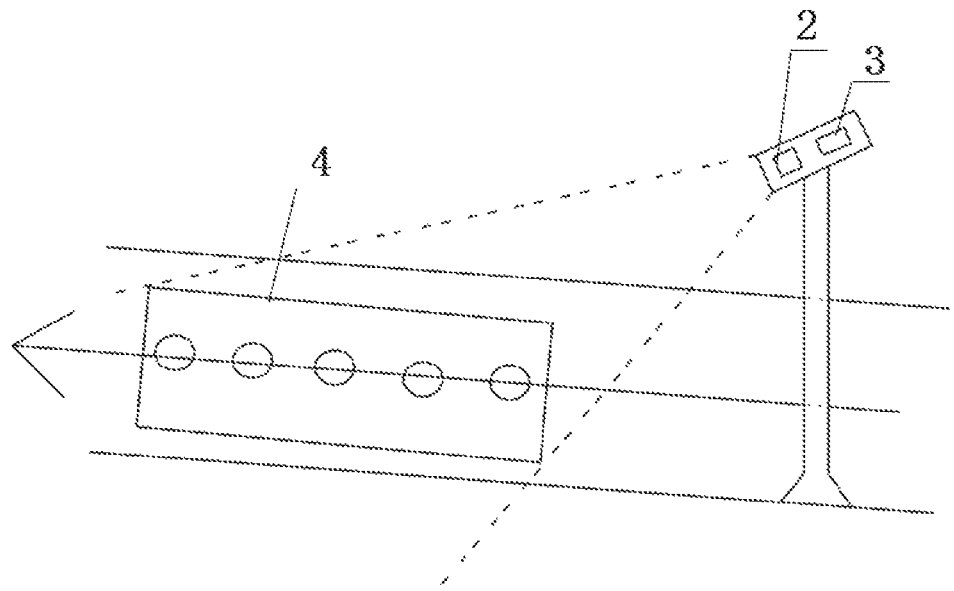
FIG. 2 is a schematic diagram of a path detection scenario according to Embodiment 1 of the present invention.

Referring to FIG. 2, the path detection system in this embodiment includes a group of SBUV light sources as markers of a path, a SBUV detector 2 and an image processing module 3. The group of SBUV light sources are paved in the center of the road at a fixed interval to form a path mark line. The SBUV detector 2 is mounted on one side or in a central zone of the road at a certain height and a certain view field range. The mounting position of the SBUV detector 2 needs to ensure that a certain number of SBUV light sources may be observed. The SBUV detector 2 may be erected by a mounting support. Both the image processing module 3 and the SBUV detector 3 are erected at a high position. The image processing module 3 has the capability of image collection and processing, and may display a result of path line information calculation.

Specific working steps of this embodiment are as follows.

The group of SBUV light sources 4, as a group of SBUV light signal emitters constituting a marker 1 of the path, may be mercury lamps, SBUV LEDs or other devices capable of generating SBUV light signals. In this embodiment, SBUV LEDs are used. In order to ensure that the intensity of each SBUV light signal may be autonomously adjusted to better fit the path detection, deep ultraviolet LEDs (DUV265-S-T039) produced by Qingdao Jason Electric Ltd., Co. are used, and then circuit design is performed. Each SBUV light signal emitter consists of a power supply, LED lamps and a constant-current source modulation circuit. In practical applications, the signal intensity may be changed by adjusting the level of the constant-current supply current. All the signal emitters operate with a constant-current supply current at a same current level. The intensity of the ultraviolet light sources is highly consistent, and a plurality of SBUV LED lamps are paved along the road center at a fixed interval.

The SBUV detector 2 may be a detector at a different view field angle, and is erected in the road center by a support. During the erection, it is required to adjust the pitch angle of the SBUV imager by the spacing of the SBUV light sources and the view field angle of the imager, so that the imager may detect SBUV LED lamps within a predetermined path range. In this embodiment, a SBUV imager having a view field angle of 30°, produced by Jiangsu Zifeng Photoelectric Ltd., Co., is used and erected at a height of h, and has a detection distance range of s1 to s2. The imager outputs information in the form of an analog video.

The image signal processing module 3 consists of a signal collection circuit, a core processing module and a signal output circuit. The signal collection circuit has the capability of converting the analog video output from the SBUV imager into digital signals. The core processor may be an ARM, a DSP, a PC or other operation units having an image processing capability. The signal output circuit outputs the image information calculated by the processor. In the design of this embodiment, the signal collection circuit consists of an AD conversion device TVP5150 and its peripheral circuits; the core processing module consists of TMS320DM642 as a processing unit and its peripheral circuits; and, the signal output signal consists of a DA conversion device SAA7121 and its peripheral circuits. A high-frequency circuit design is performed on the image processing module, and the processed video image information is displayed by an LCD screen.

Figure 3:
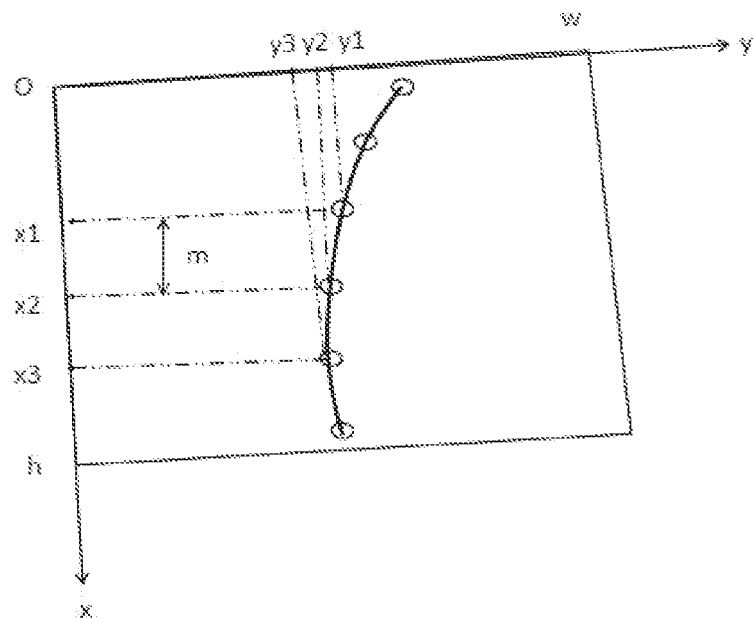
FIG. 3 is a mathematical modeling diagram of the path detection.

In the image processing module, path information is acquired by operating a road extraction algorithm. The principle of the road extraction algorithm is to map coordinates of SBUV light in the image into coordinates in a real space, and then mathematically calculate information about a path marked by the SBUV image, so as to acquire detailed parameters of the path. This embodiment provides a path extraction method by curve fitting. Referring to FIG. 3, a mathematical model is established by taking this embodiment as an application scenario, and a coordinate system is established by taking the first pixel point in the first row of the collected image information as an origin, a row increasing direction as the x-axis and a column increasing direction as the y-axis. N signals are acquired by scanning from the first line to the last line of the image, and then curve fitting is performed by using a fixed number of signal points in order as one group to approximately obtain a function f(x) of the path. Wherein, the curve fitting may be straight-line fitting, secondary curve fitting or multi-order curve fitting. If it is assumed that three signal points are used as one group of data, and the secondary curve fitting is used during path analysis. The principle of path extraction will be described by taking this assumption as an example. One group of data is (x1,y1), (x2,y2) and (x3,y3), the fitted secondary curve expression is f(x)=a*x*x+b*x+c (x1<x<x3), and the three points are introduced into f(x) to obtain parameters a, b and c. By a mathematical analysis method f(x)'=2*a*x+b, as shown, if f(x)'<0, f(x) is a monotony decrease function, and the path turns right; or otherwise, the path turns left. Meanwhile, the concavity of f(x) is discussed. At this time, the path change mode should be judged by considering the monotonicity of the function. As shown, if f(x)"=2*a>0, f(x) is concave function, and the degree at which the path will turn right increases to high from low. Similarly, the turning amount of each point in the path may be quantitatively analyzed according to a method for evaluating the curvature by a quadratic function.

Embodiment 2

Figure 4:
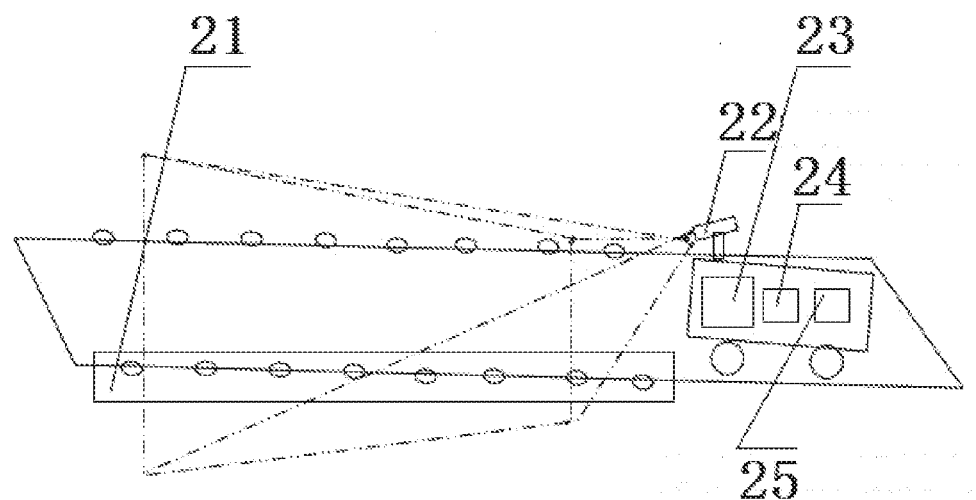
FIG. 4 is a schematic diagram of an application of automatic driving of automobiles in Embodiment 2.

The following shows another specific embodiment of the present invention. Referring to FIG. 4, this embodiment shows real-time road detection and navigation applicable to the aided driving or automatic driving of an automobile. This embodiment includes a SBUV light signal path line 21, a SBUV imager 22, a path operation and automobile controller 23, an automobile steering actuation mechanism 24 and an engine accelerating and braking actuation mechanism 25.

Specific working steps of this embodiment are as follows.

The SBUV light signal path line 21 is formed by marking a road center line, a road edge line, or a lane partition line for multiple lanes by a plurality of SBUV light signal emitters, and paving them on a road surface or a road rock or erecting them to a certain height by using a support or a suspension device. In this embodiment, the SBUV LED lamp in Embodiment 1 is used as a single SBUV light signal emitter. A number of SBUV LED lamps are paved along an edge of the road at an interval of 1 m, to form the SBUV light signal path line 21, with simple implementation steps and excellent consistency.

The SBUV imager 22 is a SBUV detector having a view field angle of 30° produced by Jiangsu Zifeng Photoelectric Ltd., Co., and is mounted on the automobile top by a fixed support. By adjusting the pitch angle, the SBUV imager 22 may detect SBUV light signals on both sides of the path, while meeting the requirement of the detection distance range of 3 m to 60 m.

The path operation and automobile controller 23 is a calculating unit having a real-time video image processing capability, and mounted inside the automobile. The path operation and automobile controller 23 is connected to an analog video output of the imager, operates a path extraction algorithm, and outputs electrical signals for automobile steering control and automobile velocity control according to the result of path calculation. The path operation and automobile controller may be a processing unit using a single-chip microcomputer, an ARM, a DSP, an SOC, an FPGA or a PC as a core. In this embodiment, a primary control device of the path operation and automobile controller is TMS320DM8148, and a set of peripheral circuits are designed for the path operation and automobile controller, so that the path operation and automobile controller may collect image information output from the SBUV imager 22 and then output the steering and velocity control amount in the form of electrical signals by operating a path extraction algorithm, a vehicle steering control algorithm and a vehicle velocity control algorithm.

The automobile steering actuation mechanism 24 is configured to refit an automobile steering device to enable it to convert the electrical signal amount output from the path operation and automobile controller 23 into a corresponding mechanical control amount, and cause the automobile steering device to perform steering according to the control amount. Similarly, the engine accelerating and braking actuation mechanism 25 is configured to refit an accelerator valve and a brake pad to enable them to convert the electrical signal amount output from the path operation and automobile controller 23 into a corresponding mechanical control amount, and cause the vehicle to change the start/stop and acceleration/deceleration of the automobile according to the control amount.

The working principle of the path detection and navigation in this embodiment is as follows.

At any moment during the automatic driving and navigation process, the SBUV imager 22 transmits the image video information from the detected SBUV light signal path line 21 to the path operation and automobile controller 23. The path operation and automobile controller 23 obtains a function expression of two path lines by curve fitting (as described in Embodiment 1), and then obtains a mathematical expression of a navigation line of the automatically driven vehicle by weighted averaging the expressions of two path edge lines. By discussing the mathematical characteristics of the expression of the navigation line, the offset direction of the path, change in the offset amount, and the path curvature are calculated in real time. Through a vehicle steering and velocity control algorithm, the vehicle is controlled in real time according to the road condition and the automatic control theory, and electrical signal control amounts for the steering and velocity are output. The electrical signal control amount is converted by the refitted automobile steering actuator into the steering control amount of the automobile steering device, so that the automobile runs along the path. The electrical signal control amount is also converted by the refitted accelerating and braking actuator into the control amount of the automobile accelerator or the brake pad, so as to run at different safety velocities under different path conditions.

Similarly, at every moment of the automatic driving and navigation process, the path operation and automobile controller performs one path operation by using the collected SBUV path information, and implements the steering and velocity control amounts through the two related actuation mechanisms, so that the automobile may run along the path at any moment. As the automobile runs, the path operation and automobile controller continuously collects new path information, and updates the automobile steering and velocity control amounts, for the purpose of automatic driving.

When this embodiment is applied, in a complex illumination and severe environment, a SBUV path line within a range of 50 m may be detected by the SBUV detector, the detection system is not susceptible to interference from the environment, and the path information amount is rich. During the real-time path information extraction, detailed path information may be acquired by simple secondary fitting, and an error between the calculated path information and the actual road information is below 0.1 m. The result of detection has high accuracy. In the automatic driving and navigation process, the detection system may detect correct path information every 30 ms and control the steering and velocity. The detection system has good timeliness.

Embodiment 3

In this embodiment, the SBUV detector 2 may consist of a plurality of SBUV one-pixel detectors. The plurality of one-pixel detectors form a SBUV receiving array at an equal interval, and acquire current path information by different path extraction algorithms.

Figure 5:
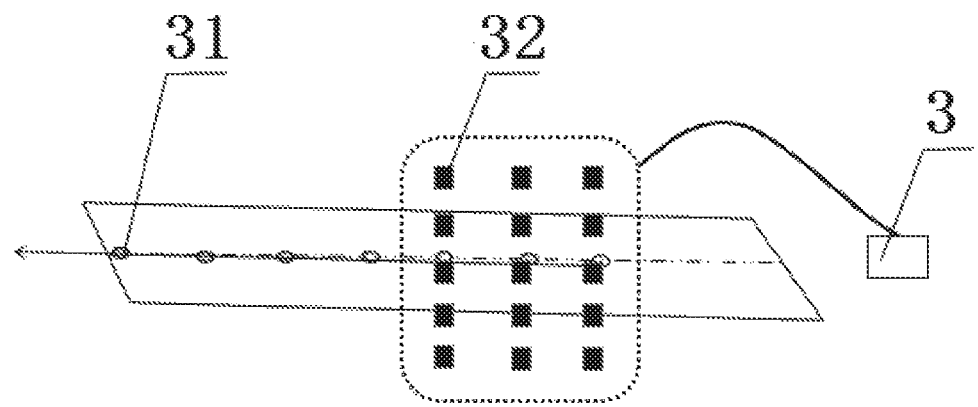
FIG. 5 is a schematic diagram of a path detection scenario according to Embodiment 3 of the present invention.

Referring to FIG. 5, a number of SBUV LED lamps 31 are paved in the road center at a fixed interval to form a path marker. A number of SBUV light signal receiving transistors 32 form a SBUV receiving array at a predetermined equal interval, and the signals from all receiving transistors are input to a signal processing module 3. The current path information may be acquired by operating a path extraction algorithm in the signal processing module 3.

During the implementation, the SBUV LED lamps 31 are SBUV LED lamps in Embodiment 1, which have good consistency in the working strength and are paved in the road center at an interval of 1 m. The SBUV light signal receiving transistors 32 are SBUV one-pixel detectors which collect SBUV light signals within a certain region and convert the strength into electrical signals for output. A plurality of one-pixel detectors form a SBUV receiving array at an interval of 0.5 m. The signal processing module 3 uses a single-chip microcomputer as a processing unit, may operate the path extraction algorithm to acquire the path.

During the path detection, the SBUV LED lamps 31 in the road center generate road mark signals; the SBUV receiving array transmits voltage signals from the ultraviolet receiving transistors to the image signal processing module 3; and, the processing module expresses the ultraviolet intensity signals from the SBUV receiving transistors in the form of a digital value. During the processing of the road information, when ultraviolet light signals greater than a certain threshold are detected, it is considered that the detection transistor is overlapped with a point in a SBUV emitter array, and the offset amount, offset direction and curvature of the path may be determined according to the degree of overlap of the SBUV receiving transistor 32 array and the SBUV LED lamp 31 array.

Figure 6:
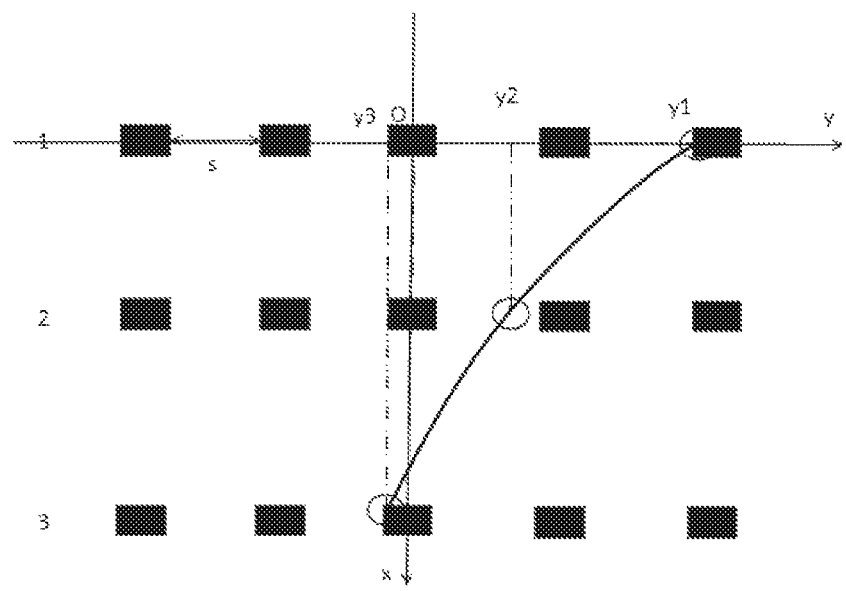
FIG. 6 is a mathematical model for path detection according to Embodiment 3 of the present invention.

Referring to FIG. 6, a universal algorithm for detecting path information by a one-pixel-detector array is shown. The SBUV light signal receiving transistors 32 form a horizontal receiving scale at a fixed interval. By deciding a receiving transistor having a signal of the highest intensity in the horizontal row, an offset amount between this receiving transistor and a middle receiving transistor is determined as an offset amount of this point in the path. As shown, the path detected by the SBUV light signal receiving array is (1,y1), (2,y2) and (3,y3). Similarly, a secondary curve $f(x)=(y3-2*y2+y1)/2*x*x+(8*y2-3*y3-5*y1)/2*x+(3y2-y3-2y1)$ may be fitted. By discussing the monotonicity, concavity and curvature of the function expression f(x), the path condition may be quantitatively analyzed, and the turning direction, path change and the turning radius of each point in the current path are eventually detected.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A path detection system based on solar blind ultraviolet light signals, comprising a SBUV light signal emitter, a SBUV detector and a signal processing module, wherein the SBUV light signal emitter is arranged on a road to serve as a path mark line; the SBUV detector is configured to detect the path mark line and transmit the detected signals from the SBUV light signal emitter to the signal processing module; and the signal processing module acquires a travelling path in real time by using a path line extraction algorithm, and outputs path information.

2. The path detection system based on SBUV light signals according to claim 1, wherein the SBUV light signal emitter can irradiate SBUV light signals at different intensities, and SBUV light signals generated by a plurality of SBUV light signal emitters for marking a path have a same intensity or different intensities.

3. The path detection system based on SBUV light signals according to claim 2, wherein the SBUV light signal emitter comprises a power supply, SBUV light sources and a signal intensity control circuit; and, when in use, the intensities of all the SBUV light sources are kept consistent.

4. The path detection system based on SBUV light signals according to claim 1, wherein the SBUV light signal emitter as a path mark line can mark a road center line, a road edge line, or a line partition line for a plurality of lanes; and, the SBUV light signal emitter is mounted by paving them on a road surface or a road rock, or erecting them to a certain height by using a support or a suspension device.

5. The path detection system based on SBUV light signals according to claim 1, wherein the SBUV detector is a SBUV imager, a SBUV one-pixel-detector array or a combination of the both, wherein the SBUV one-pixel-detector array consists of a plurality of SBUV one-pixel detectors which are arranged periodically.

6. The path detection system based on SBUV light signals according to claim 1, wherein the signal processing module comprises a core processor, and the core processor is directly connected to an output of the SBUV detector and directly outputs a result of processing.

7. The path detection system based on SBUV light signals according to claim 6, wherein the signal processing module further comprises a signal collection circuit and a signal output circuit; an input of the signal collection circuit is connected to the output of the SBUV detector, and an output of the signal collection circuit is connected to the core processor; and an output of the core processor is connected to an input of the signal output circuit.

8. The path detection system based on SBUV light signals according to claim 1, wherein the path line extraction algorithm is to map coordinates of SBUV light information detected by the SBUV detector into coordinates in a real space, and then mathematically calculate information about a path marked by a SBUV image, so as to acquire detailed parameters of the path.

9. The path detection system based on SBUV light signals according to claim 1, wherein the path line extraction algorithm is specifically as follows:
   (1) establishing a virtual coordinate system in the SBUV light information detected by the SBUV detector, and obtaining a conversion relationship between the virtual coordinate system and a real space coordinate system by calibration;
   (2) classifying the detected SBUV light spots, and obtaining a mathematical expression of a path line in the virtual coordinate system by curve fitting; and
   (3) discussing the monotonicity, concavity and curvature of a path line equation, calculating the turning direction, gradient, turning radius and other parameters of the path line at different intervals in the virtual coordinate system, and eventually obtaining path parameters of the real path line according to the conversion relationship between the two coordinate systems.

* * * * *